Oct. 30, 1951     L. D. STATHAM     2,573,285
ACCELEROMETER
Filed April 10, 1945
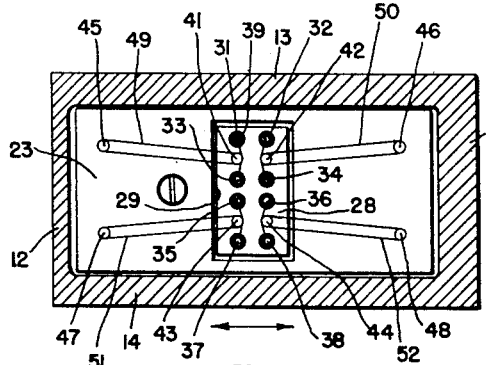
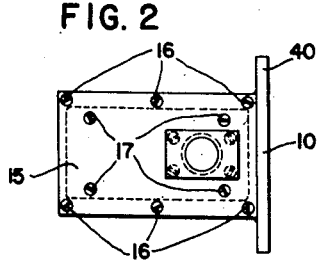
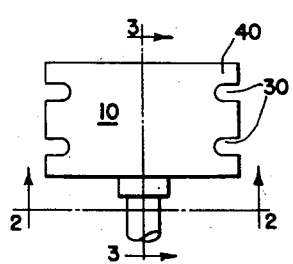
INVENTOR.
LOUIS D. STATHAM
BY George F. Goodyear
ATTORNEY Patented Oct. 30, 1951

2,573,285

UNITED STATES PATENT OFFICE 2,573,285

ACCELEROMETER

Louis D. Statham, Beverly Hills, Calif., assignor to Curtiss-Wright Corporation, a corporation of Delaware Application April 10, 1945, Serial No. 587,630

8 Claims. (Cl. 264—1)

This invention relates to an accelerometer or an instrument for accurately measuring and/or recording acceleration.

This invention in part comprises a specific adaptation of the principles of the invention disclosed in co-pending patent application Serial No. 587,631 filed April 10, 1945 in the names of Louis D. Statham and Carlos J. Baker.

In accordance with the present invention, a novel type of accelerometer has been developed, which has a number of important advantages and uses. Instruments constructed in accordance therewith are compact in size, simple and light in construction, and can be easily and quickly calibrated. They can be used to measure or record accelerations in widely different ranges, both low and high. They can be used to measure accelerations in a single direction, or in a plane, or in 3-dimensional space, by employing 1, 2 or 3 such instruments, respectively, oriented at angles to each other. They are particularly applicable to the measurement of accelerations which occur during various flight maneuvers of an airplane. Other advantages will appear as the present description proceeds.

In the drawing: Figures 1 and 2 are, respectively, bottom plan and side elevations of one embodiment according to the present invention, the side elevation being substantially as viewed from line 2—2 of Figure 1; Figure 3 is an enlarged cross section taken on the line 3—3 of Figure 1; Figures 4, 5 and 6 are sections taken along the lines 4—4, 5—5, and 6—6, respectively, of Figure 3; and Figure 7 is a schematic wiring diagram of a circuit in which the instrument according to the present invention may be incorporated.

In accordance with this invention, acceleration is measured as a function of the change in electrical resistance of one or more wires, known as strain wires, which constitute the sensitive element or elements of the instrument. These wires are caused to change in length as a result of acceleration, in a fashion as hereinafter described.

Referring now to the drawing, illustrating one embodiment of the invention, the principal working parts of the instrument are enclosed in a housing including walls 10, 11, 12, 13, 14 and 15. The thickened wall 10 may be considered as the base of the instrument, although this has no significance in the orientation of the instrument. The base 10 may be provided with slots 38 in flange portions 40, for the purpose of inserting bolts for attachment to the object whose acceleration is to be measured. The five walls 10, 11, 12, 13 and 14 are integral, while the sixth wall 15 constitutes a mounting plate to which most of the working parts of the instrument are attached. The mounting plate 15 is attached to the rest of the housing by means of screws 16.

Firmly attached to the plate 15, such as by means of bolts 17, is a fork-shaped frame member 18 provided with projecting arms 19 for attachment to the plate 15. The outer ends of projections 19 are thickened slightly to form secondary projections to which are attached, by means of screws 20, a pair of rectangular flat springs 22. Each spring 22 is attached, by means of screws 21, adjacent its opposite edge to one end of a suspended mass 23. This mass 23 is provided with a central rectangular opening 29 through which projects a projection 28 extending from the opposite side of frame member 18 from that of projections 19. It will be seen that, by this construction, mass 23 is permitted motion, by means of flexure of the springs 22, in the directions indicated by the double-ended arrows in Figures 3, 4 and 5, but is substantially prevented from motion in other directions, e. g. at right angles thereto. The degree or amount of motion in the permitted direction is restricted by means of a pin 24 rigidly mounted in mass 23 and riding in a bushing 25 inserted in frame 18. In Figure 5, the clearance between the pin 24 and the right and left edges of the bushing 25 is the amount of permitted motion, this being exaggerated for the sake of clearness in illustration.

Mounted on projection 28 are eight electrical terminals 31, 32, 33, 34, 35, 36, 37 and 38, insulated from the frame 18 by means of bushings 39. Also mounted on projection 28 are four pins 41, 42, 43 and 44, these pins being made out of insulating material or being provided with an insulating surface, such as anodized aluminum. Mounted in mass 23 are four insulating pins 45, 46, 47 and 48 similar in construction to pins 41, 42, 43 and 44.

The pins and terminals described in the preceding paragraph are used for the mounting of four strain wires 49, 50, 51 and 52 in a fashion now to be described. The wire 49 is soldered or otherwise attached, adjacent one end thereof, to the terminal 33. It is then wound successively, as shown, around the pins 41, 45 and 41 again, under a predetermined tension, and then soldered or otherwise attached adjacent the opposite end thereof, to the terminal 31. The two windings around the pin 41 are carefully kept separate from each other to avoid electrical contact therebetween. Wire 50 is similarly soldered to terminals 34 and 32 and wound around pins 42, 46 and 42 again. Wire 51 is similarly soldered to terminals 35 and 37 and wound around pins 43, 47 and 43 again. Finally, wire 52 is similarly soldered to terminals 36 and 38 and wound around pins 44, 48 and 44 again.

The strain wires 49, 50, 51 and 52 constitute the sensitive elements of the instrument. These wires should be extremely uniform in size and electrical resistivity, and should be linear in their response to change of resistivity due to change in length. The wires should also be linear in their change of length with change of applied force, that is, they should obey Hooke's law as closely as possible throughout their range of movement. By selecting wires of these characteristics, the instrument will not require extensive calibration. In addition, the wires preferably should have a relatively low temperature coefficient of resistivity. "Constantan" and "Advance" wire satisfy these requirements to a very satisfactory extent. Finally, the tension under which the wires are wound should be carefully controlled, and should preferably be uniform for all four wires. The tension should preferably be one-half the elastic limit of the wires, so that motion of the mass 23 may take place in either direction.

From the above description, it will be evident that any movement of the table 23 in the direction indicated by the arrows is accompanied by an expansion or contraction of wires 49, 50, 51 and 52. Movement to the right causes wires 49 and 51 to expand and wires 50 and 52 to contract. Movement to the left causes wires 50 and 52 to expand and wires 49 and 51 to contract. Either movement occurs as a result of a force applied to the mass 23, which is borne mainly by the wires 49, 50, 51 and 52 and to a very small extent by the springs 22. Since the linearity of response and the constancy of calibration of the wires is much more satisfactory than that of the springs, it is desired to have the springs as "soft" as possible and still give the required support, so that they may bear as little of the load as possible, such as less than 10 per cent and preferably less than 5 per cent. The connection between the frame 18 and the mass 23 may be by means other than flat springs, such as rollers. Springs are preferred, however, for several reasons: (a) their relative simplicity, and (b) the deformation of springs varies directly with the applied force, so that the response approaches linearity, while the friction due to rollers is apt to decrease rather than increase with motion.

The wires, on the other hand, bear the major portion of the load, such as in excess of 90 per cent and preferably more than 95 per cent. It is important, however, that the wires should not be strained beyond their elastic limit. This is effectually prevented by means of the stop pin 24.

As stated above, the wires 49, 50, 51 and 52 expand or contract in proportion to the force applied by the mass 23, or by the frame 18 acting in opposition to the mass 23. The mass obviously has no external connection other than through the frame 18. Consequently, it tends to remain at rest unless acted upon by an outside force (obeying Newton's first law of motion). Acceleration of the object to which the instrument is attached is thus resisted by the inertia of the mass, and this in turn results in an expansion or contraction of the wires 49, 50, 51 and 52, the amount of expansion and contraction varying directly and substantially linearly (assuming that the wires obey Hooke's law, as mentioned previously) with the force or acceleration.

By proper selection of the weight of mass 23, and the diameter and number of turns in wires 49, 50, 51 and 52, acceleration in any desired range can be readily and accurately measured. Each wire can be wound around its supporting pins one or more times, as long as the successive turns do not make electrical contact with each other. With a relatively large number of turns, or with wires of relatively large diameter, or with a relatively small mass, or combinations thereof, accelerations may be measured over a relatively wide range, but the sensitivity becomes fairly low. With a relatively small number of turns, or with wires of relatively small diameter, or with a relatively large mass, or combinations thereof, on the other hand, great sensitivity is attained, but the range is relatively narrow. It is also desired that the mass 23 and the total weight of the instrument should not be so large that it substantially affects or changes the acceleration of the object whose acceleration is being measured. The accuracy obviously depends upon the care with which the instrument is constructed.

The four wires 49, 50, 51 and 52 are incorporated as the four arms of a Wheatstone bridge, as will be described later in connection with Figure 7. The wiring to accomplish this is shown in Figures 3, 5 and 6. Terminal 32 is connected to an external terminal 55 by means of a conducting wire 56, and to terminal 31 by means of a conducting wire 57. This serves to connect one end of each of bridge arms 49 and 50 to external terminal 55. Terminal 38 is connected to an external terminal 58 by means of a conducting wire 59, and to terminal 37 by means of a conducting wire 60. This serves to connect one end of each of bridge arms 51 and 52 to external terminal 58. Terminal 36 is connected to an external terminal 61 by means of a conducting wire 62, and to terminal 33 by means of a conducting wire 63. This serves to connect the opposite ends of bridge arms 49 and 52 to external terminal 61. Finally, terminal 34 is connected to an external terminal 64 by means of a conducting wire 65, and to terminal 35 by means of a conducting wire 66, terminal 67, fixed resistor 68, terminal 69 and conducting wire 70. This serves to connect the opposite ends of bridge arms 50 and 51 to the external terminal 64, bridge arm 51 being connected through resistor 68. Since it is not practicable to make a balanced bridge with equal arms, the resistor 68 is incorporated in the bridge to bring it into balance.

With the four arms of the bridge described above approximately equal in resistance, the variation in output voltage of the bridge is directly proportional to the change in resistance of the strain wire, in accordance with well known principles of Wheatstone bridge construction. The acceleration acting to produce the change can then be read on a suitable galvanometer, whose scale divisions can be caused to read directly in acceleration units. If desired, the Wheatstone bridge, galvanometer and current source can all be incorporated in the same housing with the instrument proper. For many applications, however, a distinct advantage of the present invention is that the instrument proper (normally of small size) may be located at a considerable distance from any recording or indicating equipment, without loss of accuracy and sensitivity, and without any time lag in responding to changes in acceleration.

In Figure 7 there is shown a generally schematic view of a suitable wiring arrangement of the instrument illustrated in the remaining figures. The four strain wires 49, 50, 51 and 52 constitute the four arms of a Wheatstone bridge, as shown. The two terminals 61 and 64 are connected in conventional fashion to a power source such as a battery 71, while the remaining two terminals 55 and 58 are connected to a recording or indicating instrument such as a galvanometer 72. It will be noted that, by this arrangement, the two wires 49 and 51, which expand together and contract together, are opposite arms of the bridge. The same is true of wires 50 and 52.

The power source may include an oscillator or other similar source of alternating current, while the output circuit feeding the galvanometer or other indicating or recording equipment, such as an oscillograph, may include amplifiers, rectifiers and the like. The bridge circuit may be normally balanced or normally unbalanced, such as by means of biasing resistor 73, shown in dotted lines. An unbalanced bridge is preferred when an alternating current is used as the power source, so that the direction of force or motion fluctuations can be readily determined.

From the above description, it will be seen that there has been provided an extremely accurate and compact instrument for the measurement and/or recording of accelerations. The instrument is particularly applicable to making accurate time studies and faithfully recording accelerations varying at high frequencies. Many other uses will also be apparent from the above description.

Reference is made to a copending application, Serial No. 587,631, filed jointly by myself and Carlos J. Baker on even date herewith for "Strain Gage Measurement Instrument," which discloses and claims generic subject matter.

The above description has been with reference to a specific form of the invention. It is to be understood, however, that the invention is not to be limited except as defined in the appended claims.

I claim:

1. In an accelerometer, a fixed frame element arranged to have a fixed relationship to an object whose acceleration is to be measured, an element mounted for movement with respect to said frame element in a substantially straight line, said movable element having a mass sufficient to offer a substantial force resisting change of movement thereof, and said elements having substantially coplanar face portions first and second insulated pins mounted on such face portion of said frame element adjacent one end of said movable element, third and four insulated pins mounted on such face portion of said frame element adjacent the opposite end of said movable element, four insulated pins mounted on such face portion of said movable element, the distances between said last named pins and said first, second, third and fourth pins varying with movements of said movable element, four pairs of electrical terminals mounted on one of said elements, and four electrical wire resistors, each of said wire resistors being attached adjacent its ends to a pair of said terminals and wound around one of said first, second, third and fourth pins and one of said pins mounted in said movable element, said wire resistors wound around said first and second pins being connected as opposite arms of a Wheatstone bridge and said wire resistors wound around said third and fourth pins being connected as the remaining arms of said Wheatstone bridge, and said wire resistors being expandable and contractable within their elastic limits in direct and linear proportion to the inertia of said movable element by reason of acceleration of said fixed element and being made out of a material whose resistance varies substantially linearly with changes in length, the wire resistors wound around said first and second pins being expanded by movement of said movable element in one direction and the wire resistors wound around said third and fourth pins being expanded by movement of said movable element in the opposite direction.

2. In an accelerometer, a fixed frame element arranged to have a fixed relationship to an object whose acceleration is to be measured, an element movable with respect to said frame element, said movable element having a mass sufficient to offer a substantial force resisting change of movement thereof, a pair of leaf springs connecting said fixed and movable elements and restricting the movement of said movable element to a substantially straight line, and said elements having substantially coplanar face portions substantially parallel to said line, a plurality of insulated pins mounted on such face portion of said frame element, a plurality of spaced insulated pins mounted on such face portion of said movable element, the distance between the fixed element and movable element pins varying with movements of said movable element, a plurality of pairs of electrical terminals mounted on one of said elements, and a plurality of electrical wire resistors attached adjacent their ends to said terminals and each wound around a said pin mounted in said frame element and a said pin mounted in said movable element, said wire resistors being expandable and contractable within their elastic limits in direct proportion to the inertia of said movable element by reason of acceleration of said fixed element and being arranged to carry a major portion of the load due to inertia of said movable element.

3. In an accelerometer, a fixed frame element arranged to have a fixed relationship to an object whose acceleration is to be measured, an element movable with respect to said frame element, said movable element having a mass sufficient to offer a substantial force resisting change of movement thereof, a pair of leaf springs connecting said fixed and movable elements and restricting the movement of said movable element to a substantially straight line, a first insulated pin mounted in said frame element adjacent one end of said movable element, a second insulated pin mounted in said frame element adjacent the opposite end of said movable element, a plurality of insulated pins mounted in said movable element, all of said pins extending in the same direction from said elements, the distances between said last named pins and said first and second pins varying with movements of said movable element, a plurality of pairs of electrical terminals mounted on one of said elements, and a plurality of electrical wire resistors, at least one of said wire resistors being attached adjacent its ends to one pair of said terminals and wound around said first pin and a said pin mounted in said movable element, at least one other of said wire resistors being attached adjacent its ends to another pair of said terminals and wound around said second pin and a said pin mounted in said movable element, and said wire resistors being expandable and contractable within their elastic limits in direct proportion to the inertia of said movable element by reason of acceleration of said fixed element and being arranged to carry a major portion of the load due to inertia of said movable element.

4. In an accelerometer, a fixed frame element arranged to have a fixed relationship to an object whose acceleration is to be measured, an element movable with respect to said frame element, said movable element having a mass sufficient to offer a substantial force resisting change of movement thereof, a pair of leaf springs connecting said fixed and movable elements and restricting the movement of said movable element to a substantially straight line, first and second insulated pins mounted in said frame element adjacent one end of said movable element, third and fourth insulated pins mounted in said frame element adjacent the opposite end of said movable element, four insulated pins mounted in said movable element, all of said pins extending in the same direction from said elements, the distances between said last named pins and said first, second, third and fourth pins varying with movements of said movable element, four pairs of electrical terminals mounted on one of said elements, and four electrical wire resistors, each of said wire resistors being attached adjacent its ends to a pair of said terminals and wound under a predetermined tension around one of said first, second, third and fourth pins and one of said pins mounted in said movable element, said wire resistors wound around said first and second pins being connected as opposite arms of a Wheatstone bridge and said wire resistors wound around said third and fourth pins being connected as the remaining arms of said Wheatstone bridge, and said wire resistors being expandable and contractable within their elastic limits in direct and linear proportion to the inertia of said movable element by reason of acceleration of said fixed element, and being made out of a material whose resistance varies substantially linearly with changes in length, said wire resistors being arranged to carry a major portion of the load due to inertia of said movable element, the wire resistors wound around said first and second pins being expanded by movement of said movable element in one direction and the wire resistors wound around said third and fourth pins being expanded by movement of said movable element in the opposite direction.

5. In an accelerometer, an element for mounting on an object whose acceleration is to be measured, a movable inertia element mounted for movement relative to the first-mentioned element constrained substantially to a predetermined line, said elements having substantially coplanar faces, a first pair of insulating support means extending from such face of one element, a second pair of spaced insulating support means extending from such face of the other element, a first resistance strain wire anchored to and looped between one of the support means of said one element and the nearest one of the support means of said other element, a second resistance strain wire anchored to and looped between the other support means of said one element and the other support means of said other element, each of said wires being tensioned and said wires being so arranged that the tension of one will increase and that of the other decrease upon movement of the inertia element in either direction along said predetermined line, and means for limiting such movement of the inertia element to positions thereof in which both wires are maintained under tension which does not exceed their elastic limits.

6. In an accelerometer, an element for mounting on an object whose acceleration is to be measured, a movable inertia element mounted for movement relative to the first-mentioned element constrained substantially to a predetermined line, a pair of first insulating support means extending from face portions of one element, a pair of second insulating support means extending from face portions of the other element, all of said support means extending in the same direction from said face portions, a first resistance strain wire anchored to and looped between one of the first support means and the nearest one of the second support means, a second resistance strain wire anchored to and looped between the other of said first support means and the other of said second support means, each of said wires being tensioned and said wires being so arranged that the tension of one will increase and that of the other decrease upon movement of the inertia element in either direction along said predetermined line, and means for limiting such movement of the inertia element to positions thereof in which both wires are maintained under tension which does not exceed their elastic limits.

7. In an accelerometer, an element for mounting on an object whose acceleration is to be measured, a movable inertia element mounted for movement relative to the first-mentioned element constrained substantially to a predetermined line, one said element having an opening extending therethrough in a direction normal to said line and the other said element having a part extending through said opening, and said one element and said part of said other element having substantially coplanar face portions substantially parallel to said line, first wire support means extending from such face portion of said part, second and third wire support means extending from such face portions of said one member, said second and third wire support means being in oppositely spaced relation in the direction of said line from the first wire support means, at least one strain wire tensioned between said first and second wire support means, and at least one strain wire tensioned between said first and third wire support means.

8. In an accelerometer, a substantially rectangular first member having a central opening and opposed end portions, a second member having a portion thereof extending through said opening to provide a face substantially coplanar with the adjacent faces of said opposed end portions, a pair of leaf springs connecting said members for relative endwise movement, the end portions of said springs being secured to outer end faces of said members, and said leaf springs being substantially parallel to each other and substantially normal to the plane of said coplanar faces, and electrical resistance strain wires extending in tension along said faces in spaced relation thereto, said wires being supported by elements projecting from said faces, said wires being so arranged in tandem relation that at least one thereof is further tensioned by such relative movement in one direction and that at least one other thereof is further tensioned by such relative movement in the opposite direction, one of said members being adapted for mounting upon an object whose acceleration is to be measured in at least one of said directions, and the other of said members having a mass sufficient to offer a substantial force resisting change of movement thereof.

LOUIS D. STATHAM.

REFERENCES CITED

The following references are of record in the file of this patent:

UNITED STATES PATENTS

| Number | Name | Date |
|---|---|---|
| 2,036,458 | Carlson | Apr. 7, 1935 |
| 2,193,910 | Wilson | Mar. 19, 1940 |
| 2,210,970 | Bonell | Aug. 13, 1940 |
| 2,322,319 | Ruge | June 22, 1943 |
| 2,338,732 | Nosker | Jan. 11, 1944 |
| 2,359,245 | Ritzmann | Sept. 26, 1944 |
| 2,377,212 | Cottrell | May 29, 1945 |

OTHER REFERENCES

An article by G. Gerloff, entitled Über einen neuen Beschleunigungmesser und Einschwingvorgaenge bei Schwingungsmessern, published in Forschung auf dem Gebiete des Ingenieurswesens, vol. 8, 1937, pages 143–151. TA3. F7.

An article by Howard G. Roberts entitled Electric Gaging Methods for Strain, Movement, Pressure and Vibration, published in Instruments, vol. 17, October 1944, pages 603–605; 626 and 628.